Jan. 23, 1973 H. P. KIRCHNER 3,712,830
METHOD OF STRENGTHENING CERAMIC MATERIAL BY GLAZING
AND QUENCHING
Filed Sept. 25, 1970 17 Sheets-Sheet 1
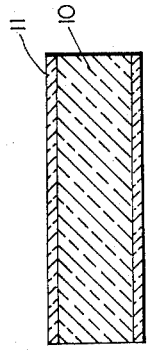
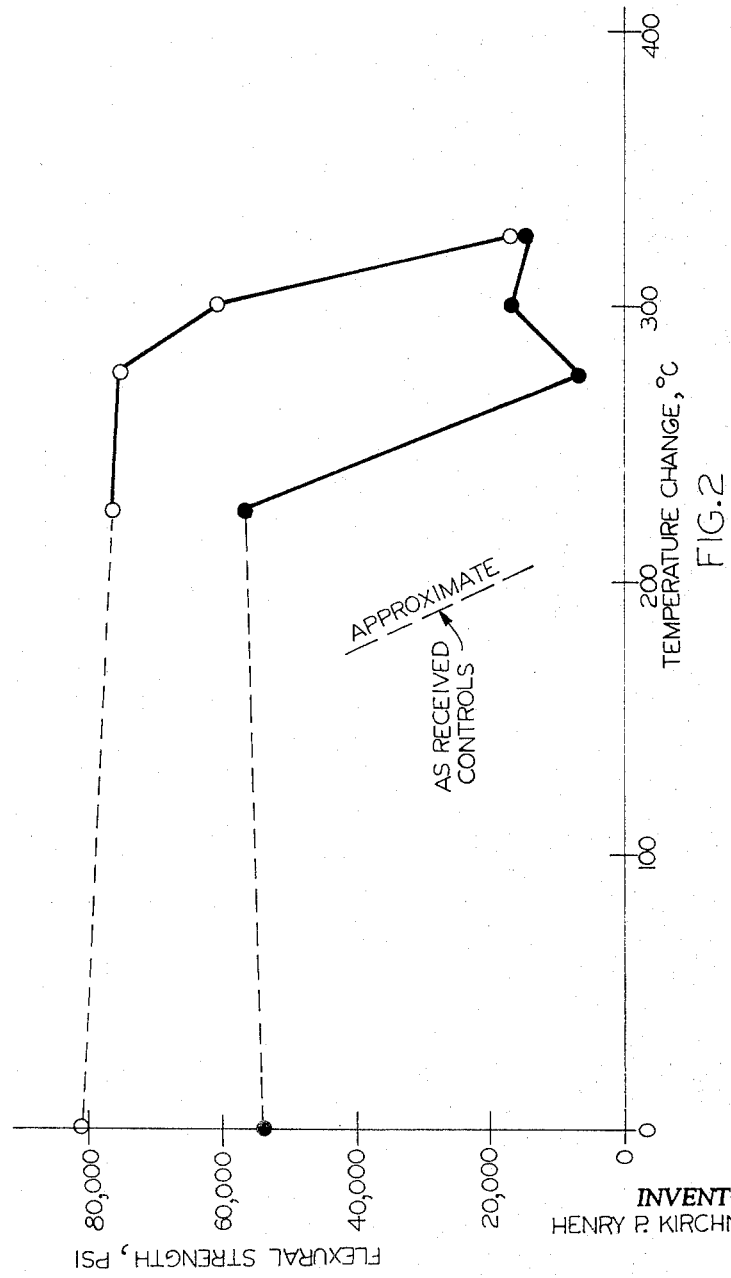
INVENTOR
HENRY P. KIRCHNER
BY
ATTORNEYS

TABLE I

Flexural Strength of ALSIMAG #614 Alumina, Glazed and Quenched
(Rods 0.15" diameter)

| No. | Treatment | Treatment Conditions Temp. °C | Treatment Conditions Time Hours | No. Samples | Flexural Strength Data Average Strength psi | Flexural Strength Data Strength Difference psi |
|---|---|---|---|---|---|---|
| | "As received" controls | - | - | 19 | 44,800 | - |
| 1. | Refired in fluorine containing atmosphere, cooled with kiln | 1500 | 1 | 5 | 56,100 | + 11,300 |
| 2. | Same as above | 1450 | 3 | 5 | 60,800 | + 16,000 |
| 3. | Refired in fluorine containing atmosphere, quenched | 1500 | 1 | 5 | 80,700 | + 35,900 |
| 4. | Same as above | 1450 | 3 | 5 | 78,200 | + 33,400 |
| 5. | Glazed, quenched from 1400°C | 1400 | 1 | 5 | 78,000 | + 33,200 |
| 6. | Glazed, cooled with kiln | 1400 | 4+ | 5 | 71,000 | + 26,200 |
| 7. | Glazed with regular glaze, refired in fluorine containing atmosphere, quenched | 1500 | 1 | 5 | 81,900 89,500* | + 37,100 |
| 8. | Same as above | 1450 | 3 | 5 | 80,900 | + 36,100 |
| 9. | Glazed with regular glaze, refired in fluorine containing atmosphere, cooled with kiln | 1500 | 1 | 5 | 59,700 | + 14,900 |
| 10. | Same as above | 1450 | 3 | 5 | 54,500 | + 9,700 |

FIG. 3A

TABLE I (Continued)

Flexural Strength of ALSIMAG #614 Alumina, Glazed and Quenched
(Rods 0.15" diameter)

| No. | Treatment | Treatment Conditions | | No. Samples | Flexural Strength Data | |
|---|---|---|---|---|---|---|
| | | Temp. °C | Time Hours | | Average Strength psi | Strength Difference psi |
| | As received controls | - | - | 19 | 49,700 | - |
| | Refired controls | 1500 | 2 | 19 | 61,900 | + 12,200 |
| 10a. | Refired in atm. containing fluorine | 1500 | 2 | 19 | 71,400 | + 21,700 |
| 10b. | Refired in atm. containing fluorine, refired, quenched | 1500, 1500 | 2,1 | 19 | 67,300 | + 17,600 |
| 10c. | Refired in atm. containing fluorine, glazed, quenched | 1500, 1500 | 2,1 | 19 | 95,600 | + 45,900 |
| 10d. | Refired in atm. containing fluorine, glazed, quenched | 1500, 1550 | 2,1 | 19 | 95,600 | + 45,900 |
| 10e. | Refired in atm. containing fluorine, glazed, refired, quenched | 1500, 1080, 1500 | 2,2,½ | 5 | 92,400 | + 42,700 |

\* Average of best four values, individual values were
<u>108,700</u>; 87,000; 81,700; 80,400; 51,500

FIG.3B

TABLE II

Results of Ring Tests-ALSIMAG #614 Rings

| No. | Treatment | Observed Closing of Ring Sample No. 1 | Sample No. 2 |
|---|---|---|---|
| | Control, quenched from 1500°C | 14 microns | -- |
| 11. | Regular glaze, cooled with furnace from 1400°C | 13 " | 21 microns |
| 12. | Regular glaze, quenched from 1400°C | 70 " | 51 " |
| 13. | Pyrex Glaze, cooled with furnace from 1400°C | 19 " | 26 " |
| 14. | Pyrex glaze, quenched from 1400°C | 77 " | 77 " |
| 15. | Packed in $Cr_2O_3$, fired at 1500°C for one hour | 6 " | 13 " |
| 16. | Packed in 50% $Cr_2O_3$+50%$CrF_3$-1/2$H_2O$, fired at 1500°C for one hour | 13 " | 19 " |

FIG. 4

HENRY P. KIRCHNER
INVENTOR

BY Wenderoth, Lind & Ponack
ATTORNEYS

TABLE III

Flexural Strength of ALSIMAG #614, Glazed and Quenched from Various Temperatures (No fluorine in furnace atmosphere, rods 0.15" diameter)

| No. | Treatment | Treatment Conditions | | No. Samples | Flexural Strength Data | |
|---|---|---|---|---|---|---|
| | | Temp. °C | Time Hours | | Average Strength psi. | Strength Difference psi. |
| | "As received" controls | -- | -- | 19 | 44,800 | --- |
| 17. | Glazed and quenched | 1100 | 1 | 5 | 63,600 | + 18,800 |
| 18. | " " " | 1200 | 1 | 5 | 64,500 | + 19,700 |
| 19. | " " " | 1300 | 1 | 5 | 69,800 | + 25,000 |
| 20. | " " " | 1400 | 1 | 5 | 77,600 | + 32,800 |

FIG. 5

HENRY P. KIRCHNER
INVENTOR

BY Wenderoth, Lind & Ponack
ATTORNEYS

TABLE IV

Flexural Strength of ALSIMAG #614, Glazed with Various Glazes
(Rods 0.15" diameter quenched in an air blast)

| No. | Treatment | Treatment Conditions | | | Flexural Strength Data | |
|---|---|---|---|---|---|---|
| | | Temp. °C | Time Hours | No. Samples | Average Strength psi. | Strength Difference psi. |
| | "As received controls | -- | -- | 19 | 44,800 | -- |
| | Quenched (thermally conditioned) | 1400 | 2 | 5 | 54,700 | + 9,900 |
| 21. | Glazed with regular glaze and quenched | 1400 | 2 | 5 | 80,900 | + 36,100 |
| 22. | Glazed with glaze #3 and quenched | 1400 | 2 | 5 | 76,500 | + 31,700 |
| 23. | Glazed with glaze #5 and quenched | 1400 | 2 | 5 | 71,500 | + 26,700 |
| 24. | Glazed with G-24 frit and quenched | 1400 | 1 | 5 | 74,400 | + 29,600 |
| 25. | Glazed with Pyrex glaze, quenched | 1400 | 1 | 5 | 74,100 | + 29,300 |

FIG. 6

HENRY P. KIRCHNER
INVENTOR

BY Wenderoth, Lind & Ponack
ATTORNEYS

TABLE V

Flexural Strengths of ALSIMAG #614, Glazed and Reglazed
(Rods 0.15" diameter)

| No. | Treatment | Treatment Conditions | | No. Samples | Flexural Strength Data | |
|---|---|---|---|---|---|---|
| | | Temp. °C | Time Hours | | Average Strength psi. | Strength Difference psi. |
| | "As received" controls | -- | -- | 19 | 44,800 | -- |
| 28. | Glazed and quenched | 1400 | 16 | 5 | 71,800 | + 27,000 |
| | Glazed and quenched | 1500 | 16 | 5 | 65,600 | + 20,800 |
| 29. | Glazed, refired, quenched, refired, quenched | 1400, 1400 | 16, 1 | 5 | 65,100 | -- |
| | Glazed, refired, quenched, glazed, refired, quenched | 1400, 1400 | 16,1 | 5 | 103,400 | -- |
| 30. | Glazed, refired, quenched, reglazed, quenched | 1500, 1400 | 16,1 | 5 | 86,500 | + 41,700 |
| 30a. | Refired in atm. containing fluorine, glazed, quenched, reglazed, quenched | 1500, 1500, 1500 | 2,1,1 | 19 | 89,400 | + 39,700 |

FIG. 7

TABLE VI

Flexural Strength of Hot Pressed Alumina; Glazed and Quenched

| No. | Starting Material | Treatment after Hot Pressing at 1480°C | Per Cent of Theoretical Density | Flexural Strength in psi (1) | | | |
|---|---|---|---|---|---|---|---|
| | | | | Controls as Hot Pressed | Air Quenched only | Glazed and Air Quenched #1 | #2 |
| 31. | $Al_2O_3$ (Linde A) | Regular glaze 1450°C 1 hr, quenched | 98.4 | 47,500(2) | -- | 47,800 | -- |
| 32. | $Al(OH)_3 \cdot nH_2O$ | Regular glaze 1450°C 1 hr, quenched | 96.6 | 52,600(2) | -- | 74,600 | -- |
| 33. | $Al(OH)_3 \cdot nH_2O$ | Regular glaze 1400°C 1 hr, quenched | 95.7 | 42,600 | 49,400 | 101,000 | 55,400 |
| 34. | $Al(OH)_3 \cdot nH_2O$ | Regular glaze 1400°C 1 hr, quenched | 96.7 | 48,800 | 53,400 | 93,500 | 87,700 |
| 35. | $Al(OH)_3 \cdot nH_2O$ | Regular glaze 1400°C 1 hr, quenched | 97.0 | 37,400 | 35,800 | 90,400 | 68,400 |

(1) measured by 3-point loading on a 1/2" span
(2) these control samples - refired at 1450°C for three hours and cooled in the furnace

FIG.8

HENRY P. KIRCHNER
INVENTOR

BY Wenderoth, Lind & Ponack
ATTORNEYS

TABLE VII

Flexural Strength of Titania, Investigation of Separate Treatments

| No. | Treatment | Treatment Conditions | | No. Samples | Flexural Strength Data | |
| --- | --- | --- | --- | --- | --- | --- |
| | | Temp. °C | Time Hours | | Average Strength psi. | Strength Difference psi. |
| | Controls | 1400 | 1 | 5 | 18,700 | -- |
| 36. | Refired and quenched | 1400,1200 | 1,1 | 5 | * | -- |
| 37. | Glazed and quenched | 1400,1200 | 1,1 | 5 | 31,200 | +12,500 |
| 38. | Glazed, cooled with kiln | 1400,1200 | 1,1 | 5 | 25,800 | +7,100 |

* Flexural strength values were 24,800; 24,800; 7,200; 8,500; 10,700 indicating that three of the samples were thermal shocked.

FIG. 9

HENRY P. KIRCHNER
INVENTOR

BY Wenderoth, Lind & Ponack
ATTORNEYS

TABLE VIII

Flexural Strength of Titania, Packing Combined with Glazing and Quenching
(LINDEN TiO$_2$ + 0.25 mole % WO$_3$)

| No. | Treatment | Treatment Conditions Temp. °C | Time Hours | No. Samples | Average Strength psi. | Strength Difference psi. |
|---|---|---|---|---|---|---|
| | Controls | 1400 | 1 | 5 | 17,500 | -- |
| 39. | Refired in fluorine cont'g atm. | 1400,1400 | 1,1 | 5 | 23,700 | + 6,200 |
| 40. | Packed in 90%Cr$_2$O$_3$+10%CrF$_3$.3-1/2H$_2$O | 1400,1400 | 1,1 | 5 | 20,700 | + 3,200 |
| 41. | Packed in 90%SnO$_2$+10%AlF$_3$.xH$_2$O | 1400,1400 | 1,1 | 5 | 19,500 | + 2,000 |
| 42. | No fluorine atm., glazed, quenched | 1400,1200 | 1,1 | 5 | 27,700 | +10,200 |
| 43. | Refired in fluorine cont'g atm., glazed, quenched | 1400,1400, 1200 | 1,1,1 | 5 | 29,800 | +12,300 |
| 44. | Packed in 90%Cr$_2$O$_3$+10%CrF$_3$.3-1/2H$_2$O, glazed and quenched | 1400,1400, 1200 | 1,1,1 | 5 | 30,900 (34,100)* | +13,400 |
| 45. | Packed in 90%SnO$_2$+10%AlF$_3$.xH$_2$O glazed and quenched | 1400,1400 1200 | 1,1,1 | 5 | 31,100 | +13,600 |

\* Average of 4 highest values.

FIG. 10

Jan. 23, 1973  H. P. KIRCHNER  3,712,830
METHOD OF STRENGTHENING CERAMIC MATERIAL BY GLAZING
AND QUENCHING
Filed Sept. 25, 1970  17 Sheets-Sheet 11

FIG.11

TABLE IX

Flexural Strength of DEGUSSA-SP23 Spinel, Glazed and Quenched

| No. | Treatment | Treatment Conditions | | No. Samples | Flexural Strength Data* | |
|---|---|---|---|---|---|---|
| | | Temp. °C | Time Hours | | Average Strength psi. | Strength Difference psi. |
| | Refired controls | 1300 | 1 | 3 | 23,800 | -- |
| 46. | Glazed with regular glaze and quenched | 1300 | 1 | 3 | 29,600 | + 5,800 |

\* Three-point loading on a one inch span

FIG.12

TABLE X

Flexural Strength of Steatite, Glazed and Quenched

| No. | Treatment | Treatment Conditions | | No. Sample | Flexural Strength Data | |
|---|---|---|---|---|---|---|
| | | Temp. °C | Time Hours | | Average Flexural Strength psi. | Strength Difference psi. |
| 47. | Refired controls | 1300 | 1 | 5 | 37,000* | -- |
| 48. | Glazed and quenched | 1300 | 1 | 5 | 43,600* | + 6,600 |
| 49. | Glazed and cooled with kiln | 1300 | 1 | 5 | 30,500* | - 6,500 |

\* three-point loading on a one-inch span

HENRY P. KIRCHNER
INVENTOR

BY Wenderoth, Lind & Ponack
ATTORNEYS

TABLE XI

Flexural Strength of Forsterite, Glazed and Quenched

| No. | Treatment | Treatment Conditions | | No. Sample | Flexural Strength Data | |
| --- | --- | --- | --- | --- | --- | --- |
| | | Temp. °C | Time Hours | | Average Flexural Strength psi. | Strength Difference psi. |
| | Refired controls | 1300 | 1 | 5 | 15,500 | -- |
| 50. | Glazed and quenched | 1300 | 1 | 5 | 17,400 | + 1,900 |
| 51. | Glazed, cooled with kiln | 1300 | 1 | 5 | 14,700 | - 800 |

FIG.13

HENRY P. KIRCHNER
INVENTOR

BY Wenderoth, Lind & Ponack
ATTORNEYS

TABLE XII

Flexural Strength of Zircon Porcelain, Glazed and Quenched
(ALSIMAG #475, rods 0.120" diameter)

| No. | Treatment | Treatment Conditions | | | Flexural Strength Data | |
|---|---|---|---|---|---|---|
| | | Temp. °C | Time Hours | No. Samples | Average Strength psi. | Strength Difference psi. |
| | "As received" controls | -- | -- | 5 | 29,300 | -- |
| | Refired controls | 1400 | 1 | 5 | 29,300 | -- |
| 52. | Refired and quenched | 1400 | 1 | 5 | 32,200 | + 2,900 |
| 53. | Glazed with regular glaze refired, cooled with kiln | 1400 | 1 | 5 | 28,600 | - 700 |
| 54. | Glazed with regular glaze, refired, quenched | 1400 | 1 | 5 | 33,400 | + 4,100 |

FIG. 14

HENRY P. KIRCHNER
INVENTOR

BY Wenderoth, Lind & Ponack
ATTORNEYS

TABLE XIII

Flexural Strength of Linde Single Crystal Alumina with various Treatments

| No. | Treatment | Firing Conditions | | | Flexural Strength Data | | |
|---|---|---|---|---|---|---|---|
| | | Temp. °C | Time Hours | No. Samples | Average Flexural Strength psi. | Strength Difference psi. | |
| | As received - not oriented | -- | -- | 5 | 103,056 | -- | |
| 55. | Fired, quenched - not oriented | 1500 | 1-Quench | 5 | 175,032 | + 71,970 | |
| 56. | Glazed, fired, quenched - not oriented | 1500 | 1-Quench | 5 | 196,025 | + 92,969 | 345,800* |
| | As received (1) | -- | -- | 5 | 88,828 | -- | |
| 57. | Fired, quenched (1) | 1500 | 1-Quench | 5 | 116,440 | + 27,512 | |
| 58. | Glazed, fired, quenched (1) | 1500 | 1-Quench | 5 | 288,228 | + 199,400 | 301,100* |
| 59. | Fired, cooled with kiln (1) | 1500 | 1-Slow Cool | 5 | 190,797 | + 101,969 | 360,308* |
| 60. | Glazed, fired, cooled with kiln (1) | 1500 | 1-Slow Cool | 4 | 278,007 | + 189,179 | |
| | As received, abraded | -- | -- | 5 | 47,063 | -- | |
| 61. | Glazed, fired, quenched, abraded | 1500 | 1-Quench | 4 | 217,235 | + 170,172 | |
| | As received (2) | -- | -- | 5 | 104,851 | -- | |
| 62. | Fired, quenched (2) | 1500 | 1-Quench | 5 | 138,624 | + 33,773 | |

FIG. 15A

Jan. 23, 1973     H. P. KIRCHNER     3,712,830
METHOD OF STRENGTHENING CERAMIC MATERIAL BY GLAZING AND QUENCHING
Filed Sept. 25, 1970     17 Sheets-Sheet 15

TABLE XIII (Continued)

Flexural Strength of Linde Single Crystal Alumina with various Treatments

| No. | Treatment | Firing Conditions | | | Flexural Strength Data | |
|---|---|---|---|---|---|---|
| | | Temp. °C | Time Hours | No. Samples | Average Flexural Strength psi. | Strength Difference psi. |
| 63. | Glazed, fired, quenched (2) | 1500 | 1-Quench | 5 | 308,019 | + 203,168 |
| | | | | | 349,100* | |
| | | | | | 323,000* | |
| | | | | | 311,900* | |
| 64. | Fired, cooled with kiln (2) | 1500 | 1-Slow Cool | 5 | 162,690 | + 57,839 |
| 65. | Glazed, fired, cooled with kiln (2) | 1500 | 1-Slow Cool | - | 300,956 | - 196,105 |

(1) oriented - Broken with crystal plane edge up
(2) oriented - Broken with crystal plane edge at 90% to applied load
\* High strength samples among samples of group

FIG. 15B

HENRY P. KIRCHNER
INVENTOR

BY Wenderoth, Lind & Ponack
ATTORNEYS

FIG. 16  TABLE XIV

SURFACE COOLING RATE FOR 0.125 INCH DIAMETER ALUMINA RODS QUENCHED FROM 1500°C (96%) $Al_2O_3$

SURFACE TEMPERATURE

| TIME IN SECONDS | IN STILL AIR | | IN FORCED AIR (60 CFM) | | IN SILICONE OIL (D.C. 200-100 Cst) | |
|---|---|---|---|---|---|---|
| | RATE °C/sec. | TEMP. °C | RATE °C/sec. | TEMP. °C | RATE °C/sec. | TEMP. °C |
| 0– 1 | 90 | 1410 | 200 | 1300 | 340 | 1160 |
| 1– 4 | 35 | 1310 | 150 | 830 | 170 | 650 |
| 4–10 | 25 | 1170 | 60 | 480 | 75 | 200 |
| 10–20 | 15 | 1030 | 30 | 200 | | |
| 20–40 | 10 | 840 | | | | |
| 40–70 | 5 | 740 | | | | |

FIG. 17  TABLE XV

SURFACE COOLING RATE FOR 0.2 INCH DIAMETER ALUMINA RODS QUENCHED FROM 1500°C (96% $Al_2O_3$)

SURFACE TEMPERATURE

| TIME IN SECONDS | IN STILL AIR | | IN FORCED AIR (60 CFM) | | IN SILICONE OIL (D.C. 200-100 Cst) | |
|---|---|---|---|---|---|---|
| | RATE °C/sec. | TEMP °C | RATE °C/sec. | TEMP. °C | RATE °C/sec. | TEMP. °C |
| 0– 1 | 80 | 1420 | 130 | 1370 | 180 | 1320 |
| 1– 4 | 30 | 1340 | 70 | 1160 | 120 | 960 |
| 4–10 | 20 | 1220 | 40 | 940 | 50 | 640 |
| 10–20 | 15 | 1070 | 25 | 700 | 30 | 360 |
| 20–40 | 10 | 860 | 15 | 480 | | |
| 40–70 | 5 | 680 | | | | |

INVENTOR
HENRY PAUL KIRCHNER

ATTORNEY

3,712,830
Patented Jan. 23, 1973

3,712,830
METHOD OF STRENGTHENING CERAMIC MATERIAL BY GLAZING AND QUENCHING
Henry P. Kirchner, 700 S. Sparks St.,
State College, Pa. 16801
Continuation-in-part of abandoned application Ser. No. 669,861, Sept. 22, 1967. This application Sept. 25, 1970, Ser. No. 75,329
Int. Cl. C03c 17/04
U.S. Cl. 117—125                                       19 Claims

ABSTRACT OF THE DISCLOSURE

A method of increasing the strength of a ceramic body having a body thermal expansion coefficient and a body softening temperature. The surface of the body is coated at least once with a glaze which has a glaze thermal expansion coefficient and which has a glaze softening temperature which is lower than the body softening temperature, and which has a minimum firing temperature intermediate said body softening temperature and said glaze softening temperature. The coated body is fired at least one time to a temperature higher than the glaze firing temperature, and the body softening temperature and lower than the melting point of the material of the body. The glazed fired body is quenched in a quenching medium at an average surface cooling rate of at least 10° C./sec., and at a rate below that which will cause thermal shock from the firing temperature to a temperature below the glaze softening temperature for first causing more rapid cooling of the exterior of the body than the interior for causing plastic flow in the interior of the body and producing positive compressive stresses in the exterior of the body, and then after passing the body softening temperature, for causing the glaze to be placed under a positive compressive stress resulting from the difference between the product of the body expansion coefficient and the temperature change of the body below the body softening temperature and the glaze expansion coefficient and the temperature change of the glaze below the glaze softening temperature. By this method the bending strength of the body is increased as compared with an unglazed and unfired body of the same ceramic.

This application is a continuation-in-part of application Ser. No. 669,861, filed Sept. 22, 1967, now abandoned.

The present invention relates to the strengthening of ceramic bodies, and more particularly relates to a method of greatly increasing the strength of such ceramic bodies by glazing the bodies and then quenching them.

The term "ceramic body" as used throughout this application is intended to mean both polycrystalline bodies as well as single crystal bodies.

Recent research has indicted the probable importance of surface flaws in the mechanisms resulting in failure of well made polycrystalline ceramics. The prevention of such flaws from acting to cause failure should go a long way toward improvement of the strength and thermal shock resistance of such ceramics.

Heretofore the principal method of preventing such surface flaws from acting to cause failure has been the formation of compressive surface layers on the polycrystalline ceramic bodies. Compressive surface layers have been formed in several ways, but the most extensively used method has been by the formation of low-expansion surface layers on the surface of the bodies by chemical reactions at high temperatures. During cooling after sintering, the base or main body of the ceramic material tends to contract more than the surface layers, thereby causing compressive stresses in the surface layers. Failure of the surface layers due to shearing is prevented by establishing gradual variations in the composition of the body where it is joined by the surface layers. The variations in the composition results in variations in expansion coefficient, which, in turn, result in gradual variations in stress and reduction of the maximum shear stress in the surface layer.

In the case of alumina bodies, which have many uses in industry and hence are of particular interest, one method of strengthening has involved the fluorination of the polycrystalline alumina bodies, and then refiring at a high temperature with the bodies packed in a chromium containing compound in order to reconstitute the bodies with the compressive surface layer thereon. This method has a drawback that under certain circumstances is quite objectionable, namely, the temperatures for refiring are in the neighborhood of 1750° C., and not only is it difficult to heat the ceramic bodies to this temperature, but it is also quite expensive to provide and operate the equipment necessary to heat to these temperatures.

It is an object of the present invention to provide a method for strengthening ceramic bodies which does not have the drawbacks of the prior art method as described above, and that leads to higher compressive stress than has been previously attained in the surfaces of conventional polycrystalline ceramic bodies.

It is a further object of the invention to provide a method for strengthening ceramic bodies which greatly increases the strength thereof as compared to the increased strength obtained by the prior art method as described above.

These objects are achieved by carrying out the steps of the method as follows. The surface of the body is coated at least once with a glaze which has a glaze thermal expansion coefficient and which has a glaze softening temperature which is lower than the body softening temperature and which has a minimum firing temperature intermediate said body softening temperature and said glaze softening temperature. The coated body is fired at least one time to a temperature higher than the glaze firing temperature and the body softening temperature and lower than the melting point of the material of the body. The glazed fired body is quenched in a quenching medium at an average surface cooling rate of at least 10° C./sec. and at a rate below that which will cause thermal shock from the firing temperature to a temperature below the glaze softening temperature for first causing more rapid cooling of the exterior of the body than the interior for causing plastic flow in the interior of the body and producing positive compressive stresses in the exterior of the body, and then after passing the body softening temperature for causing the glaze to be placed under a positive compressive stress resulting from the difference between the product of the body expansion coefficient and the temperature change of the body below the body softening temperature and the glaze expansion coefficient and the temperature change of the glaze below the glaze softening temperature. By this method the binding strength of the body is increased as compared with an unglazed and unfired body of the same ceramic.

The invention will now be described in greater detail in connection with the accompanying drawing, in which:

FIG. 1 is a representation of a ceramic body which has been glazed and then refired to fuse the glaze;

FIG. 2 is a graph showing the thermal shock resistance characteristics of a ceramic body strengthened by the method of the invention;

FIGS. 3–17 are Tables I–XV, respectively; and

Figure 18:
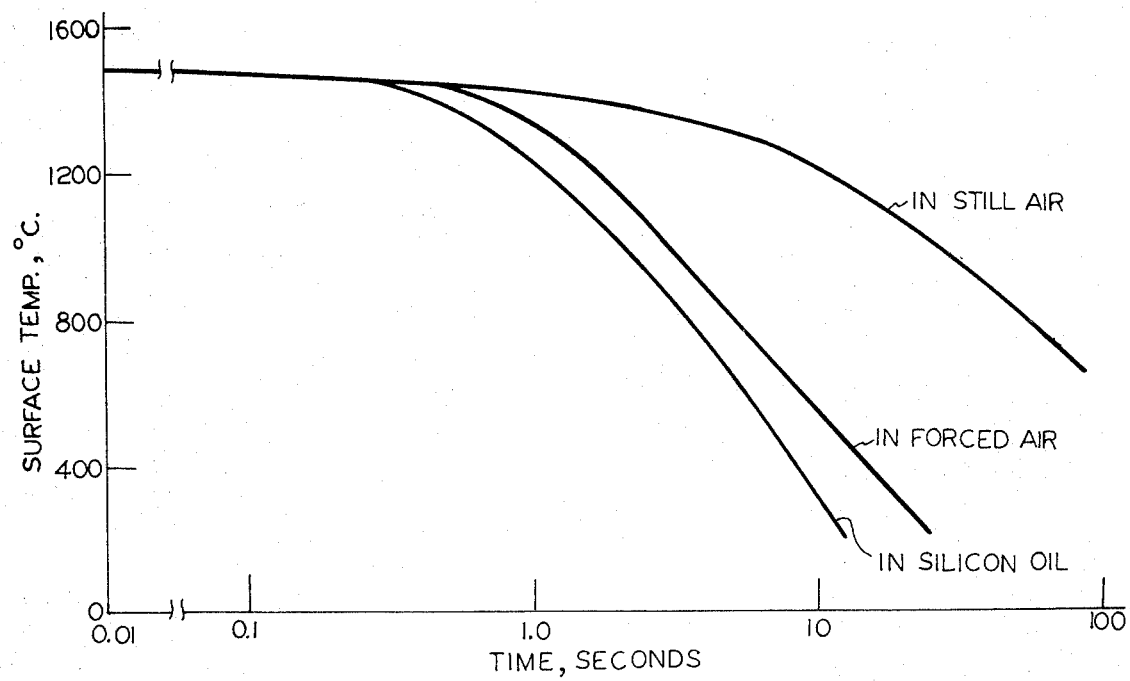
FIGS. 18 and 19 are graphs of the data in Tables XIV and XV.

As shown in FIG. 1, a ceramic body 1 has thereon a coating 2 of a glaze material which has been fused by firing at or above the fusing temperature for the glaze. The ceramic body can be any appropriate ceramic material, but is preferably a material taken from the group consisting of alumina, Steatite ($MgSiO_3$), Forsterite ($Mg_2SiO_4$), titania ($TiO_2$), Zircon porcelain and Spinel, while the glaze material for the coating 2 can be a material such as is described hereinafter with respect to the several examples.

The glaze materials are intended to be exemplary only, because it is believed that the glaze material can be chosen depending on the nature of the material of the body, as well as the nature of the glaze material itself, to give a maximum value of compressive strain in the glaze coating during cooling.

There are two things working to produce the increased strength of the glazed and quenched ceramic body. First, during the quenching from the maximum firing temperature to a temperature at which the entire body is rigid, the interior of the body will cool more slowly than the exterior of the body, there will be plastic flow in the interior of the body, and positive compressive stress will be produced in the exterior of the body. This contributes substantially to the strength of the body.

Secondly, and in addition to the above strengthening effect, the glaze has a compressive stress produced therein according to the following formula:

$$\epsilon_C = \Delta L_B - \Delta L_G = \alpha_B \Delta T_B - \alpha_G \Delta T_G$$

in which
$\epsilon_C$ is the compressive stress in the glaze;
$\alpha_B$ is the thermal expansion coefficient of the body;
$\alpha_G$ is the thermal expansion coefficient of the glaze;
$\Delta T_B$ is the temperature range through which the body is cooled after plastic flow stops and the body becomes rigid; and
$\Delta T_G$ is the temperature range through which the glaze is cooled after the glaze becomes rigid.

During quenching the glaze on the outside of the body becomes rigid at low temperatures, while the alumina body underneath is still at high temperatures. Therefore $\alpha_B \Delta T_B$ is much greater than $\alpha_G \Delta T_G$, and the difference of the two terms is great.

It will be seen that if the thermal expansion coefficients $\alpha$ of the body and the glaze coating are equal, the equation becomes:

$$\epsilon = \alpha(\Delta T_B - \Delta T_G)$$

showing that for the maximum stress in the glaze coating the glaze material should be selected so that it has a low softening point so that it cools only a relatively small amount after it hardens while the body on which it is coated will still be hot beneath the glaze and will cool a large amount after the glaze becomes rigid. In actual practice, it is preferred to use materials having coefficients of expansion that are sufficiently different to produce an additional compressive stress in the surface layer due to the differences in the coefficient of expansion, yet which are sufficiently close together to produce a significant compressive stress surface layer by the above described mechanism.

It will be clear from the foregoing that the temperature to which the body coated with the glaze must be fired is above the glaze firing temperature and above the softening temperature of the ceramic material of the body. The upper limit on the firing temperature is the temperature at which the ceramic material of the body no longer holds its shape, which will be in the vicinity of the melting temperature of the ceramic.

In order to cool the glazed ceramic body from the firing temperature sufficiently rapidly so that the more rapid cooling of the exterior of the body is achieved, and so that the glaze is cooled more quickly to its softening temperature than the body within the glaze is cooled to that temperature, it is necessary to quench the glazed body from the firing temperature. The lower limit of the cooling can take place sufficiently rapidly to accomplish the desired results at 10° C./sec. The upper limit on the rapidity of cooling is, of course, a cooling rate which will cause thermal shock of the ceramic of the body. This can vary from ceramic material to ceramic material.

It should be understood that by "quenching" is meant a cooling which is rapid as compared to conventional speed of cooling for ceramics. There are a number of ways in which this quenching can be carried out. The glazed bodies can simply be removed from the furnace and allowed to stand in ambient air. This is a much faster cooling than gradual cooling in the kiln in which the bodies remain in the firing furnace, the furnace simply being opened up and allowed to cool by natural flow of the ambient air. The bodies can also be placed in a stream of forced air at room temperature or a somewhat elevated temperature, but below the glaze softening point. Finally, they can be immersed in a liquid quenching medium at room temperature, or a temperature above room temperature but below the glaze softening point. Silicone oil has been found to be a very satisfactory quenching medium. Light motor oil and water have been found to cool too rapidly, at least as far as the specific examples set forth hereinafter are concerned, but may be satisfactory for very small bodies having lower expansion coefficients than the specific ceramics of the examples. By elevating the temperature of the quenching medium, it is easier to avoid thermal shock.

In any event, the particular method of quenching is not critical as long as the minimum cooling rate is achieved. The particular method of quenching will be governed by such considerations as the bodies being strengthened, the necessity of cooling rapidly to increase production speed, the necessity to remove bodies from a furnace in order to make room in the furnace for other bodies, etc.

The rapid cooling is not all at the same rate. Because the glazed bodies at the time of firing are so hot, cooling in the initial stages is more rapid than in the final stages due to the larger heat gradient between the bodies and the quenching medium. Therefore when reference is made to "quenching" at an average rate, it is to be understood that the initial cooling will always be at a more rapid rate and the final cooling to the temperature below the glaze softening temperature can be at a lower rate than average.

In order to make clear the manner in which the method of this invention is carried out there will now be given a series of examples in which polycrystalline alumina bodies have been coated with various types of glazes under various conditions.

In the prior art it has been customary to strengthen ceramic bodies by using glazes having lower expansion coefficients than the body on which they are placed. If the differences in the expansion coefficients is too great, cracks form. This defect is called shivering. In spite of the high stresses obtained in the surface layers by this new method, shivering has not been observed.

EXAMPLES 1–10

A series of alumina rods made of ALSIMAG 614, 96% pure $Al_2O_3$ made by American Lava Corporation, 0.15" in diameter were prepared. They were treated in various ways and the results were as shown in Table I. The samples of Examples 1, 2 and 10a were refired in a fluorine containing atmosphere at a temperature of 1500° C., 1450° C., and 1500° C., respectively, for the times given and then cooled in the kiln by allowing the kiln to cool naturally. The samples of Examples 3 and 4 were treated the same way, and in addition were quenched in an air blast of air at ambient temperature and 60 c.f.m. (cubic feet per minute) from the temperatures given to ambient, i.e. room temperature. The samples of these examples were not glazed according to the present invention.

The samples of Examples 5 and 6 were glazed and refired in air, and then were quenched in an air blast of air at room temperature at 60 c.f.m. and cooled in the ambient air in the kiln, respectively, from the 1400° C.

firing temperature. The glaze used was a so-called regular glaze having the following composition, the parts being by weight:

"Regular" Glaze

| | Percent |
|---|---|
| Frit | 56.3 |
| Nepheline Syenite | 9.7 |
| Talc | 2.9 |
| Fla Kaolin | 9.7 |
| Whiting | 6.8 |
| Flint | 14.6 |
| | 100 |

The Frit forming part of the regular glaze had the following composition:

Frit

| | Percent |
|---|---|
| $SiO_2$ | 53.50 |
| $Al_2O_3$ | 8.41 |
| $B_2O_3$ | 7.44 |
| $ZrO_2$ | 1.33 |
| $Na_2O$ | 2.24 |
| $CaO$ | 6.53 |
| $MgO$ | 0.80 |
| $PbO$ | 18.30 |
| $K_2O$ | 1.41 |
| $Fe_2O_3$ | 0.04 |
| | 100.00 |

The samples of Examples 7 and 8 were glazed with regular glaze, then refired in a fluorine containing atmosphere at the temperatures and times given, and then quenched in an air blast of air at ambient temperature and 60 c.f.m. to ambient temperature. The samples of Examples 9 and 10 were treated the same as in Examples 7 and 8, except that instead of being quenched in an air blast, they were cooled in the kiln in air at ambient temperature.

The samples of Examples 10b were refired in an atmosphere containing fluorine, were refired in an air atmosphere, and then quenched in the same manner, while the samples of Examples 10c and 10d were refired in an atmosphere containing fluorine, glazed with the regular glaze, fired to cause the glaze to fuse, and then quenched in the same manner, while the samples of Example 10e were refired in an atmosphere containing fluorine, glazed with a regular glaze, fired at 1080° C. to fuse the glaze, and then refired at 1500° C. and quenched in the same manner.

The results show that as compared with the controls, to which no treatment has been applied, all of the glazed samples have increased strengths. The firing of the samples in the fluorine containing atmosphere without glazing or quenching has little effect. Simply glazing the samples and either quenching them or simply cooling them in the kiln significantly increases the strengths, and as between quenching and simply cooling in the kiln, quenching clearly increases the strength more. If the firing is carried out in a fluorine containing atmosphere, the strength is increased somewhat more, whether for quenching or simply cooling in the kiln, as compared with simply firing in an air atmosphere. It is to be noted, however, that the highest strength value was obtained for one glazed sample of Example 7 which was fired in a fluorine containing atmosphere and then quenched, and that this strength value was a remarkable 63,900 p.s.i. greater than the average strength of the controls. Quenching from a higher temperature gave generally higher strengths than quenching from a lower temperature.

EXAMPLES 11–16

In order to determine the relative compressive forces in the treated surfaces, ring tests were made, and the results are given in Table II. In each case, the rings were the same size, about 1" in diameter with about 1/16" thick bodies, and after they were treated, e.g. by glazing or otherwise treating the outside surfaces thereof, they were partially cut through and markers were mounted on the edges of the cut. The distance between the markers was measured accurately using a microscope with a calibrated scale in the eyepiece. The remainder of the ring was cut, and the ends of the cut ring and the markers moved closer together as a result of the stresses being partly relieved. The distance between the markers was measured again, the distance the markers moved being a measure of the relative magnitude of the compressive stresses.

The samples of Examples 11 and 12 were glazed with the regular glaze and were respectively cooled from 1400° C. in the kiln and were quenched in an air blast of air at ambient temperature and 60 c.f.m. from said temperature to ambient temperature. The samples of Examples 13 and 14 were glazed with a Pyrex glaze, which was ground up Pyrex glass, and kiln cooled and quenched in the same manner, respectively, from 1400° C. As some measure of comparison, the samples of Examples 15 and 16 were treated according to a prior known method by being packed in a chromium oxide containing composition and fired at 1500° C. for one hour.

As can be seen from the distances observed for the closing of the rings, the compressive stresses in the exterior surfaces of the rings which were glazed and then quenched were substantially higher than in the exterior surfaces of the rings which were not quenched but merely glazed or packed in a chromium oxide material when they were refired. This clearly indicates that there are compressive forces in the glaze coating which has been quenched.

EXAMPLES 17–20

The effect of the temperature from which the material is quenched was studied by heating ALSIMAG 614 rods 0.15" in diameter and glazed with a regular glaze in a furnace with an air atmosphere to various glazing temperatures, and the rods were then quenched in an air blast of air at ambient temperature and 60 c.f.m. to ambient temperatures. The results are set forth in Table III, from which it can be seen that the flexural strength increases with an increase in the temperature from which the materials are quenched. Thus, the higher the temperature from which the materials are quenched, the stronger they may be expected to be.

EXAMPLES 21–25

In order to investigate different glazes, a series of ALSIMAG 614 rods 0.15" in diameter were prepared and were coated with various types of glaze compositions as indicated in Table IV, and were heated to a glazing temperature of 1400° C. The glazes differed from each other mainly in that the glazes No's. 3 and 5 had a higher viscosity than the so-called regular glaze, and the frit had a lower viscosity than the regular glaze. As can be seen from the flexural strength values, the regular glaze gives the greatest improvement in strength over the "as received" controls, and the samples which were merely heated and quenched. The compositions of glazes No's. 3 and 5 were as follows:

Glaze No. 3

| | Percent |
|---|---|
| Increased $Al_2O_3$+$SiO_2$+decreased flux | |
| Frit | 40.2 |
| Nepheline syenite | 20.3 |
| Fla kaoline | 17.6 |
| Talc | 2.6 |
| Whiting | 6.1 |
| Flint | 13.2 |
| | 100.0 |

Glaze No. 5

|  | Percent |
|---|---|
| Increased Al₂O₃+reduced flux | --- |
| Talc | 3.7 |
| Whiting | 7.5 |
| Fla kaoline | 35.9 |
| Flint | 50.4 |
| Potash | 2.5 |
|  | 100.0 |

EXAMPLES 26–27

The thermal shock resistance of glazed alumina rods was tested by taking two groups of five samples of ALSIMAG 614, and while leaving one group of samples unglazed and coating the other group with regular glaze as described above, heating the samples to 1400° C. for 1 hour and quenching both groups of samples in an air blast of air at ambient temperature and 60 c.f.m. to ambient temperature. The first sample in each group was then tested for flexural strength without having been subject to any thermal shock. The second samples were heated to about 220° C. and cooled suddenly by quenching in water at room temperature. The third samples were heated at about 280° C. and quenched in an air blast as described above, the fourth samples heated to about 300° C. and quenched in the same manner, and the last samples heated to about 320° C. and quenched in the same manner. The results are shown in the graph of FIG. 2, from which it can be seen that the failure in thermal shock of the glazed rods does not occur until a temperature drop of almost 300° C. is imposed on them, while the unglazed rods can withstand only about a 250° C. temperature drop. This is a decisive improvement in thermal shock resistance, and is due to the compressive surface layer of the glaze material.

In studying the effect of longer firing times on the improvement of the strength of the materials, it has been found that a good improvement in the strength can be obtained by reglazing, refiring and requenching. Examples of this further processing are given in the following examples.

EXAMPLES 28–30a

Rods of ALSIMAG 614 alumina which were 0.15" in diameter were first glazed with regular glaze and fired and then quenched in an air blast of air at ambient temperature and 60 c.f.m. to ambient temperature. The rods of Example 28 were then simply refired and again quenched in the same manner, while the rods of Examples 29 and 30 were reglazed, refired and again quenched in the same manner. The rods of Example 30a were refired in a fluorine containing atmosphere, glazed, quenched from 1500° C. in the same manner, reglazed and quenched from 1500° C. in the same manner. The temperatures and time conditions were as given in Table V, from which it is seen that the first firing is for a period of 16 hours, while the refiring is for a period of only 1 hour. The temperatures are all 1400° C. except for the initial firing or Example 30, which is 1500° C., and the firing in Example 30a, which is also 1500° C.

From the table it can be seen that as compared with the "as received" control samples, the flexural strengths are greatly increased, while the strengths are significantly increased over the samples which were merely glazed and quenched and not reglazed and quenched again.

The question of whether the unflawed surface which was produced as a result of glazing was responsible for the increased strength was considered, and in order to demonstrate that it was not, samples which had been glazed and fired were abraded and were tested and their strength was found to be substantially unaltered as compared to similarly treated unabraded samples.

EXAMPLES 31–35

The effect of glazing and quenching is not confined to the polycrystalline sintered alumina used in Examples 1–30. The same effect is produced by glazing and quenching hot pressed polycrystalline alumina. In the following examples, various types of alumina were hot pressed to the densities given in Table VI. Certain of them were glazed with a regular glaze, and then the glazed and unglazed samples heated to either 1450° C. in the cases of Examples 31 and 32, and to 1400° C. in the cases of Examples 33–35, and then quenched in an air blast of air at ambient temperature and 60 c.f.m. to ambient temperature. As can be seen from the flexural strengths of the samples, the glazing and quenching of the hot pressed alumina substantially increases the flexural strength as compared with the controls which were only hot pressed and with the samples which were only air quenched.

EXAMPLES 36–38

Glazing and quenching polycrystalline titania also improves the flexural strength characteristics of this material. With reference to Table VII, three groups of polycrystalline titania samples which had been fired at 1400° C. were treated, the first group simply being heated to 1200° C. and quenched in an air blast of air at ambient temperature and 60 c.f.m. to ambient temperature, the second group being glazed with the regular glaze and quenched in an air blast in the same way from 1200° C. to ambient temperature, and the third group being glazed with the regular glaze and cooled in the kiln from 1200° C. to ambient temperature. The results are shown in Table VII, from which it can be seen that as compared with the controls, the strength of the glazed and quenched samples is greatly increased. The samples which were cooled in the kiln after glazing showed much less improvement in strength. It is noteworthy that the majority of samples which were simply fired and quenched were thermal shocked, while those that were glazed and quenched were not, thereby indicating the improvement in the thermal shock characteristics of the glazed and quenched titania.

EXAMPLES 39–45

Pretreatment of the titania can be used to further improve the flexural strength characteristics of the glazed and quenched titania, as can be seen from the following examples, reference being made to Table VIII. Groups of titania samples, all of which were initially fired at 1400° C., were treated in various ways, those of Example 39 being simply refired in a fluorine containing atmosphere at 1400° C. and cooled gradually, and those of Examples 40 and 41 being packed in different packing materials and fired at 1400° C. and cooled gradually. These examples were treated according to prior art methods in order to obtain samples for comparison with like samples which were additionally glazed and quenched. The samples of Example 42 were simply glazed and quenched in an air blast of air at ambient temperature and 60 c.f.m. The samples of Example 43 were, after being refired in a fluorine containing atmosphere, glazed with the regular glaze and heated to 1200° C. and then quenched in an air blast in the same manner to ambient temperature. The samples of Examples 44 and 45 were packed in the same packing materials as used in Examples 40 and 41, and after firing in the packing, were glazed with the regular glaze, heated to 1200° C. and quenched in an air blast in the same manner to ambient temperature.

As can be seen from the flexural strengths of the various samples, the glazed and quenched samples which have been refired in a fluorine containing atmosphere have greater strengths than those similarly treated but not glazed and quenched while the glazed and quenched samples which have been fired in a packing material have greater strengths than those similarly treated but not glazed and quenched.

EXAMPLE 46

A group of samples of polycrystalline spinel (MgO·Al$_2$O$_3$) which was DEGUSSA SP-23 spinel, was glazed with the regular glaze and fired at 1300° C. for 1 hr. and then quenched in an air blast of air at ambient temperature and 60 c.f.m. As shown in Table IX, the flexural strength thereof was increased substantially over the control which was simply refired spinel.

EXAMPLES 47–49

A group (see Example 48, Table X) of samples of polycrystalline Steatite (MgSiO$_3$), which was DC-144 Steatite obtained from Du-Co ceramics Co., were glazed with the regular glaze and heated to 1300° C. for one hour and then quenched in an air blast of air at ambient temperature and 60 c.f.m. to ambient temperature. A second group (see Example 49, Table X) were similarly treated except that they were cooled gradually in the klin instead of being quenched.

As can be seen from the flexural strength characteristics as given in Table X, the glazing and quenching significantly increases the strength as compared with control samples of Example 47 which were simply refired, while glazing and gradual cooling did not, in this instance, increase the strength, but on the contrary decreased it.

EXAMPLES 50–51

Two groups of samples of polycrystalline Forsterite (Mg$_2$SiO$_4$), which was DC 200 Forsterite obtained from Du-Co Ceramic Co., were coated with regular glaze and fired at 1300° C. for one hour, and the first group was quenched in an air blast of air at ambient temperature and 60 c.f.m. to ambient temperature while the second group was cooled gradually in the kiln. As seen from Table XI, the flexural strength of the glazed and quenched material was significantly greater than the strength of either the refired controls or the glazed and kiln cooled samples.

EXAMPLES 52–54

A first group of ALSIMAG 475 polycrystalline zircon porcelain rods made by American Lava Corp. 0.120" in diameter were simply refired at 1400° C. and quenched in an air blast of air at ambient temperature and 60 c.f.m., while a second group of like rods were glazed with a regular glaze, refired at 1400° C. and cooled in the kiln, and a third group was likewise glazed, refired and quenched in an air blast in the same manner.

As can be seen from the results given in Table XII, the glazing followed by quenching gave a large increase in flexural strength over the "as received" controls and the controls which were simply refired, and gave a significant increase in flexural strength over the rods which were simply refired and quenched.

EXAMPLES 55–65

The method of the present invention is also applicable to single crystal ceramic materials. A group of single crystal alumina bodies in which the crystal phase was corundum made by Linde Corp. in the form of rods 0.10" in diameter was simply fired at 1500° C. for 1 hour and then quenched in an air blast of air at ambient temperature and 60 c.f.m., while a second group was glazed with a regular glaze and then fired at 1500° C. and quenched in an air blast in the same manner.

Two further groups of single crystal bodies, the groups of Examples 57 and 62, were fired and quenched in the same manner as in Example 55, and two further groups, the groups of Examples 58 and 63, where glazed with a regular glaze and then fired and quenched as in Example 56. Two more groups, the groups of Examples 59 and 64, were simply fired at 1500° C. and then cooled in the kiln, while another two groups, the groups of Examples 60 and 65, were glazed with the regular glaze and then fired in the same manner and cooled in the kiln. The samples of the groups in Examples 57–60 were then strength tested by positioning them in the testing jig with the edge of the crystal plane up, while the samples of the groups in Examples 62–65 were strength tested by placing them in the testing jig with the crystal plane at a 90° angle to the direction of the applied load. The tests of the flexural strength were therefore taken in the first groups of samples in a manner to determine the strength along the plane of the crystal, while the tests of the flexural strength in the second groups were taken in a manner to determine the strength transverse to the plane of the crystal.

As can be seen from Table XIII, the average flexural strength increased significantly as compared to the "as received" controls and as compared with the samples which were simply refired and quenched, even when the tests were made without regard for the orientation of the single crystal bodies with respect to the plane of the crystals. When the crystals were oriented, it was found that the strength was increased even when taken in the direction parallel to the plane of the crystal, and was increased most in the direction transverse to the plane of the crystal. It is important to note that large increases of strength were given to the single crystal bodies even when they were not quenched but were simply cooled slowly in the kiln. This indicates that the glazing step of the invention is effective even without quenching when the invention is applied to single crystal bodies.

A further group of samples, those of Example 61, were glazed with the regular glaze, fired at 1500° C. for one hour, and quenched in an air blast of air at ambient temperature and 60 c.f.m., and then the surface thereof was abraded. The flexural strength as shown in Table XIII was not decreased greatly, indicating that this treatment will be very effective on ceramic bodies which are subject to abrasion during normal use.

EXAMPLE 66

Figure 19:
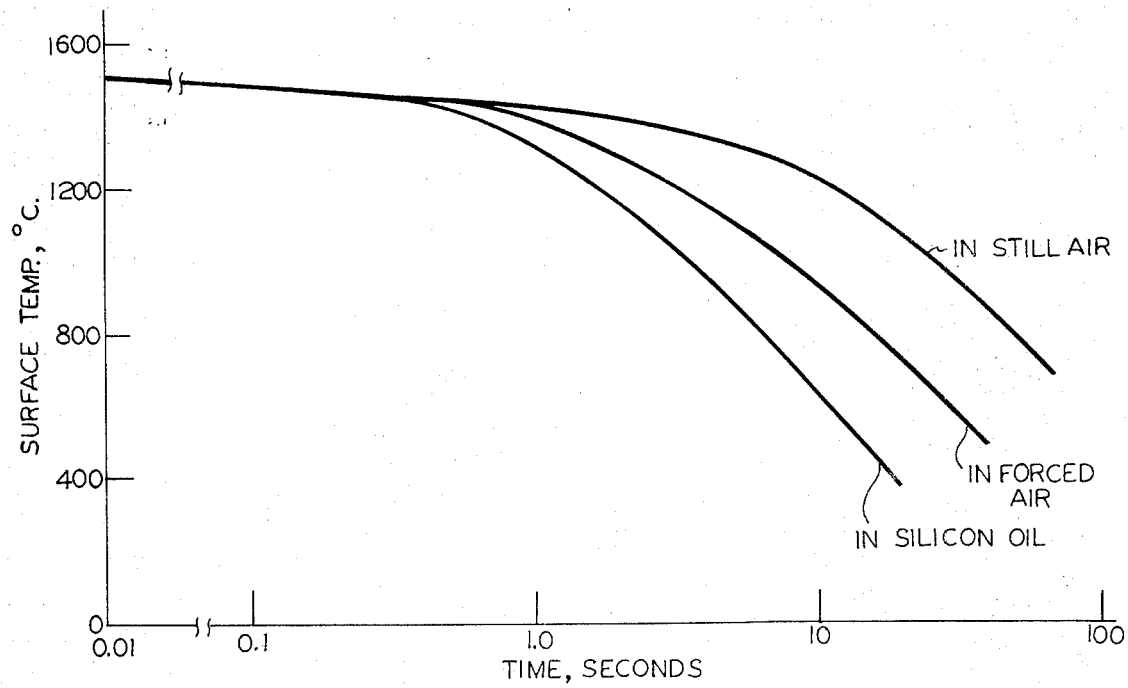

To show what the actual surface cooling rates during quenching are, two series of alumina rods of 96% pure alumina were prepared, one of 0.125" in diameter and the other 0.2" in diameter. The rods were fired to 1500° C. and quenched in still air, i.e. by removing them from the furnace and allowing them to stand in ambient air, in a blast of forced air at ambient temperature and 60 c.f.m., and in silicone oil (D.C. 200–100 Cst). The temperatures at the surfaces of the rods were measured as they cooled. The rates of cooling for the various periods of time from the start of quenching are shown in Tables XIV and XV, and the data is plotted in the graphs of FIGS. 18 and 19.

It will be seen that the surface cooling is at a rapid rate at first and that the rate slows. While the rate of cooling in still air near one minute is below the average of 10° C./sec. set forth above as being the lower limit of the rate of cooling according to the invention, it will be understood that the average rate of cooling over the whole time of cooling is higher due to the high rate at the start of cooling.

Because the film coefficient of heat transfer for glazed bodies is substantially the same as for unglazed bodies, the surface cooling rates for glazed bodies will be quite close to those for the unglazed bodies. Thus the cooling rates for Examples 1–65 will be comparable to those for the unglazed rods.

The method according to the invention provides greatly improved flexural strengths in ceramic bodies, both polycrystalline and single crystal, which have been glazed and quenched, and in addition, the glaze firing temperatures are relatively low as compared to refiring temperatures of the prior art methods of strengthening ceramic bodies. The resulting bodies also have increased the thermal shock resistance.

What is claimed:

1. A method of increasing the strength of a ceramic body having a body thermal expansion coefficient and a body softening temperature comprising the steps of coating the surface of the body with a first coating of a glaze which has a glaze thermal expansion coefficient and which has a glaze softening temperature which is lower than the body softening temperature and which has a minimum firing temperature intermediate said body softening temperature and said glaze softening temperature, firing the coated body at least a first time to a temperature higher than the glaze firing temperature and the body softening temperature and lower than the melting point of the material of the body, and then quenching the glazed fired body in a quenching medium at an average surface cooling rate of at least 10° C./sec. and at a rate below that which will cause thermal shock from the firing temperature to a temperature below the glaze softening temperature for first causing more rapid cooling of the exterior of the body than the interior for causing plastic flow in the interior of the body and producing positive compressive stresses in the exterior of the body, then after passing the body softening temperature for causing the glaze to be placed under a positive compressive stress resulting from the difference between the product of the body expansion coefficient and the temperature change of the body below the body softening temperature and the glaze expansion coefficient and the temperature change of the glaze below the glaze softening temperature, and then performing at least once the series of steps of coating the body with a second coating of the glaze, again firing the body, and again quenching the body, whereby the bending strength of the body is increased as compared with the unglazed and unrefired body of the same ceramic.

2. A method of increasing the strength of a ceramic body having a body thermal expansion coefficient and a body softening temperature, comprising the steps of coating the surface of the body at least once with a glaze which has a glaze thermal expansion coefficient and which has a glaze softening temperature which is lower than the body softening temperature and which has a minimum firing temperature intermediate said body softening temperature and said glaze softening temperature, firing the coated body at least one time to a temperature higher than the glaze firing temperature and the body softening temperature and lower than the melting point of the material of the body and then quenching the glazed fired body in a quenching medium at an average surface cooling rate of at least 10° C./sec. and at a rate below that which will cause thermal shock from the firing temperature to a temperature below the glaze softening temperature for first causing more rapid cooling of the exterior of the body than the interior for causing plastic flow in the interior of the body and producing positive compressive stresses in the exterior of the body, and then after passing the body softening temperature for causing the glaze to be placed under a positive compressive stress resulting from the difference between the product of the body expansion coefficient and the temperature change of the body below the body softening temperature and the glaze expansion coefficient and the temperature change of the glaze below the glaze softening temperature, whereby the bending strength of the body is increased as compared with an unglazed and unrefired body of the same ceramic.

3. A method as claimed in claim 2 in which the ceramic of the body is a ceramic material taken from the group consisting of alumina, titania, spinel, Forsterite, Steatite and zircon porcelain.

4. A method as claimed in claim 2 in which the glaze has a composition of:

| | Percent |
|---|---|
| Frit | 56.3 |
| Nepheline Syenite | 9.7 |
| Talc | 2.9 |
| Fla Kaolin | 9.7 |
| Whiting | 6.8 |
| Flint | 14.6 |

5. A method as claimed in claim 2 in which the ceramic material is alumina and the glaze has a composition of:

| | Percent |
|---|---|
| Frit | 56.3 |
| Nehpeline Syenite | 9.7 |
| Talc | 2.9 |
| Fla Kaolin | 9.7 |
| Whiting | 6.8 |
| Flint | 14.6 |

6. A method as claimed in claim 2 in which the ceramic material is alumina and the glaze has a composition of:

| | Percent |
|---|---|
| Frit | 40.2 |
| Nepheline Syenite | 20.3 |
| Fla Kaolin | 17.6 |
| Talc | 2.6 |
| Whiting | 6.1 |
| Flint | 13.2 |

7. A method as claimed in claim 2 in which the ceramic material is alumina and the glaze has a composition of:

| | Percent |
|---|---|
| Talc | 3.7 |
| Whiting | 7.5 |
| Fla Kaolin | 35.9 |
| Flint | 50.4 |
| Potash | 2.5 |

8. A method as claimed in claim 2 in which the ceramic material is titania and the glaze has a composition of:

| | Percent |
|---|---|
| Frit | 56.3 |
| Nepheline Syenite | 9.7 |
| Talc | 2.9 |
| Fla Kaolin | 9.7 |
| Whiting | 6.8 |
| Flint | 14.6 |

9. A method as claimed in claim 2 in which the ceramic material is spinel and the glaze has a composition of:

| | Percent |
|---|---|
| Frit | 56.3 |
| Nepheline Syenite | 9.7 |
| Talc | 2.9 |
| Fla Kaolin | 9.7 |
| Whiting | 6.8 |
| Flint | 14.6 |

10. A method as claimed in claim 2 in which the ceramic material is Forsterite and the glaze has a composition of:

| | Percent |
|---|---|
| Frit | 56.3 |
| Nepheline Syenite | 9.7 |
| Talc | 2.9 |
| Fla Kaolin | 9.7 |
| Whiting | 6.8 |
| Flint | 14.6 |

11. A method as claimed in claim 2 in which the ceramic material is Steatite and the glaze has a composition of:

| | Percent |
|---|---|
| Frit | 56.3 |
| Nepheline Syenite | 9.7 |
| Talc | 2.9 |
| Fla Kaolin | 9.7 |
| Whiting | 6.8 |
| Flint | 14.6 |

12. A method as claimed in claim 2 in which, prior to the step of glaze coating the body, the body is fired at least once in a fluorine containing atmosphere.

13. A method as claimed in claim 2 wherein the ceramic is polycrystalline.

14. A method as claimed in claim 2 wherein the ceramic is a single crystal.

15. A ceramic body having increased strength, the body being of a ceramic material having a body thermal expansion coefficient and a body softening temperature, the surface of the body having thereon at least one coating of a glaze which has a glaze thermal expansion coefficient and which has a glaze softening temperature which is lower than the body softening temperature and which has a minimum firing temperature intermediate said body softening temperature and said glaze softening temperature, the coated body having been fired at least one time to a temperature higher than the glaze firing temperature and the body softening temperature, and lower than the melting point of the material of the body, and then quenched in a quenching medium so as to be quenched at an average surface cooling rate of at least 10° C./sec. and at a rate below that which will cause thermal shock from the firing temperature to a temperature below the glaze softening temperature, the exterior of the body having been more rapidly cooled than the interior for causing plastic flow in the interior of the body for producing positive compressive stresses in the exterior of the body, and the glaze having been placed under a positive compressive stress resulting from the difference between the product of the body expansion coefficient and the temperature change of the body below the body softening temperature and the glaze expansion coefficient and the temperature change of the glaze below the glaze softening temperature, whereby the bending strength of the body is increased as compared with an unglazed and unrefired body of the same ceramic.

16. A ceramic body as claimed in claim 15 in which the ceramic material is polycrystalline.

17. A ceramic body as claimed in claim 15 in which the glaze coating has a thermal expansion coefficient substantially the same as the thermal expansion coefficient of the ceramic material.

18. A ceramic body as claimed in claim 15 in which the ceramic material is a material taken from the group consisting of alumina, titania, spinel, Forsterite, Steatite and zircon porcelain.

19. A ceramic body as claimed in claim 15 in which the ceramic material is a single crystal.

References Cited

UNITED STATES PATENTS

| | | | |
|---|---|---|---|
| 3,403,047 | 9/1968 | Cummings et al. | 106—49 |
| 3,184,320 | 5/1965 | Michael | 106—49 |
| 3,055,762 | 9/1962 | Hoffman | 106—49 |
| 2,588,920 | 3/1952 | Green | 117—123 X |
| 3,384,508 | 5/1968 | Bopp et al. | 117—123 A |

OTHER REFERENCES

Ceramics Industry, vol. 88, No. 1, January 1967, pp. 137–139.

RALPH S. KENDALL, Primary Examiner

U.S. Cl. X.R.

106—48; 117—119.4, 169